United States Patent [19]

Suzuki et al.

[11] Patent Number: 4,582,413
[45] Date of Patent: Apr. 15, 1986

[54] INDICATING APPARATUS FOR A CAMERA

[75] Inventors: Nobuyuki Suzuki; Shinichi Matsuyama, both of Kanagawa, Japan

[73] Assignee: Canon Kabushiki Kaisha, Tokyo, Japan

[21] Appl. No.: 701,423

[22] Filed: Feb. 14, 1985

[30] Foreign Application Priority Data

Feb. 14, 1984 [JP] Japan .................................. 59-26281

[51] Int. Cl.[4] ............................................. G03B 17/18
[52] U.S. Cl. ................................. 354/475; 354/238.1; 354/267.1; 354/289.1
[58] Field of Search ................... 354/267.1, 465, 471, 354/474, 475, 266, 289.1, 237, 238.1, 267.1, 467

[56] References Cited

U.S. PATENT DOCUMENTS

| | | | |
|---|---|---|---|
| 4,322,146 | 3/1982 | Shimizu et al. | 354/467 |
| 4,367,933 | 1/1983 | Sahara | 354/467 |
| 4,466,721 | 8/1984 | Detuzzi | 354/267.1 |
| 4,472,045 | 9/1984 | Alyfuku et al. | 354/467 |
| 4,525,054 | 6/1985 | Someya et al. | 354/238.1 |

Primary Examiner—Russell L. Adams
Attorney, Agent, or Firm—Toren, McGeady, Stanger, Goldberg & Kiel

[57] ABSTRACT

The present invention relates to a camera capable of both bulb and self-timer photography. The feature of the present invention is that the indicating mode for indicating the time of the self-timer is made different from that of the bulb exposure when bulb photography is carried out after a lapse of time of the self-timer, thus clarifying the change-over operation from the self-timer to the bulb exposure, whereby the remaining time of the self-timer and the time lapse of the bulb exposure can be indicated clearly.

13 Claims, 2 Drawing Figures

INDICATING APPARATUS FOR A CAMERA

BACKGROUND OF THE INVENTION

1. Field of the Invention

The present invention relates to a camera that is specifically capable of selecting a self-timer mode and a bulb mode.

2. Description of the Prior Art

Normally in the case of the self-timer mode, the release button is depressed for a moment so as to start the exposure.

On the other hand, in the case of bulb photography the release button is continuously depressed, thus, the operation is quite different from that of the self-timer mode.

Consequently, until now, the selection position for the self-timer mode and the bulb mode were provided on the same dial in order to avoid the simultaneous selection thereof which would result in a misoperation.

However, in the case of bulb photography, the exposure lasts for a long time and the camera should be held firmly while the release button is depressed. Thus, normally a cable release or the like is applied in order to avoid the shock which occurs when depressing the release button by hand.

Concerning the manual shock in the case of bulb photography if carried out in the self-timer mode; even if manual shock occurs during a time when the release button is depressed, the shock takes place while the self-timer is in operation, which means that the exposure does not actually begin until the manual shock is no longer felt. Basically, the problem of manual shock can be solved to some extent even without use of the cable release. Therefore, it is desirable that the self-timer mode and the bulb mode can be selected at the same time.

SUMMARY OF THE INVENTION

It is accordingly, an object of the present invention to allow for bulb photography in the self-timer mode, whereby the timing of the self-timer and that of the bulb operation are made clearly distinguishable from each other so as to improve the operability.

It is another object of the present invention to avoid any inconvenience that may arise if the photographer accidentally selects the self-timer mode and the bulb mode at the same time, by making it impossible to carry out the exposure operation even if a normal operation in the self-timer mode is made (the instantaneous depression of the release button).

Further purposes and features of the present invention will become apparent from the following description of the embodiments of the present invention with reference to the accompanying drawings.

DETAILED DESCRIPTION OF THE PREFERRED EMBODIMENTS

Figure 1:
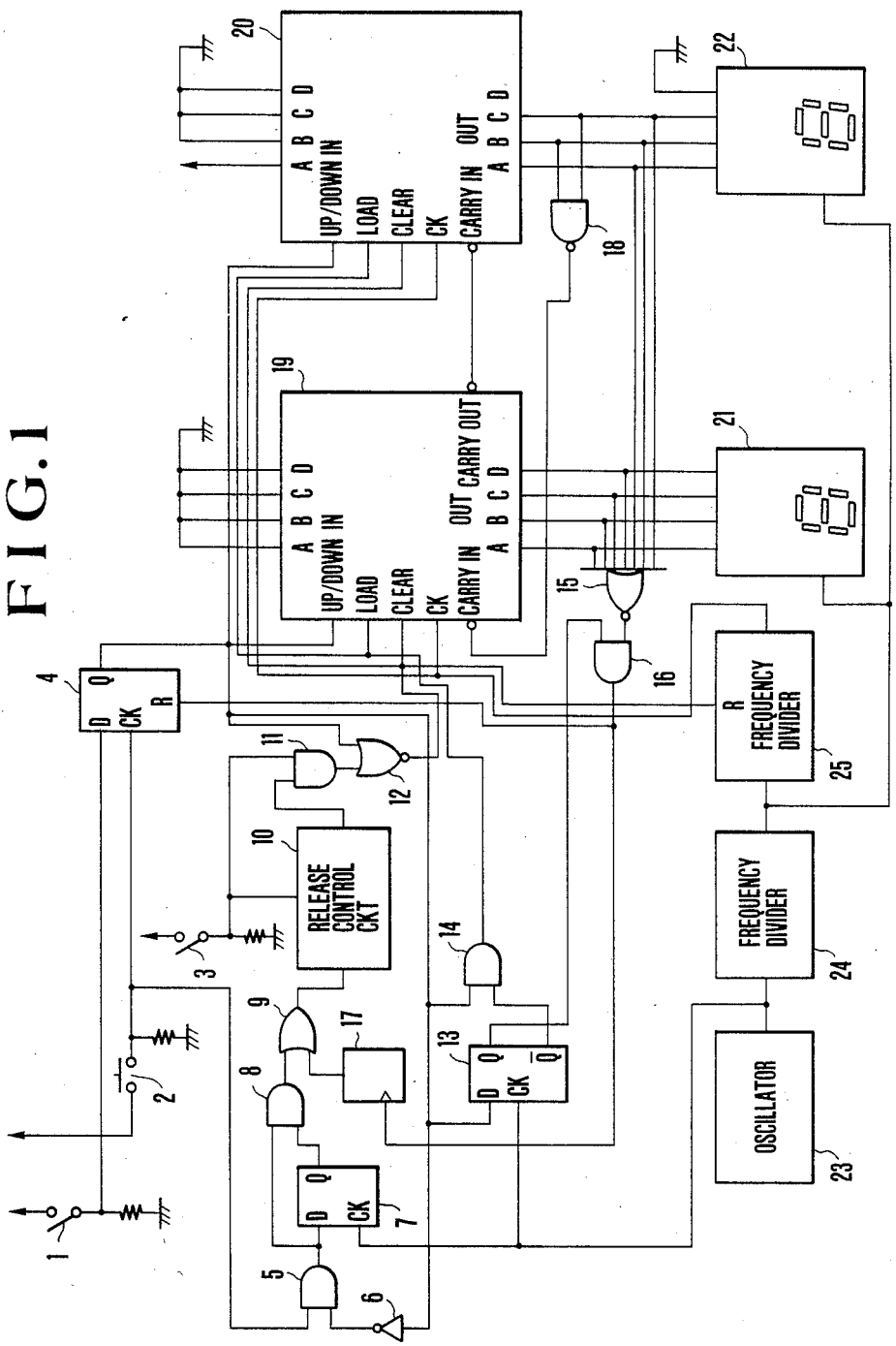
FIG. 1 is a circuit diagram showing an embodiment of a camera according to the present invention.

Below, the camera of this invention will be described. FIG. 1 shows the circuit of an embodiment of the camera of the present invention. In the drawing, 1 is a self-timer selecting switch to be closed by selecting the self-release mode with the mode selecting slider (not shown), 2 is a release switch to be closed by depressing the release button, 3 is a bulb selecting switch to be closed by selecting the bulb release with the shutter dial (not shown), 4 is a D-type flip flop (hereinafter called DFF) which stores the self-operation signal until the termination of the self-operation, and 5 is an AND gate for obtaining the non-self release signal from the non-self operation signal obtained from the self-operation signal from the DFF 4 through an inverter 6 and from the release signal from the release switch 2.

The AND gate 5 of the above construction delivers a high level signal (hereinafter called H) as the release operation signal when the release button is depressed in the non-self mode.

7 is a DFF and 8 is an AND gate, both of which constitute a chattering prevention circuit for transmitting the H as the release signal to a release control circuit 10 via an OR gate 9 when the release operation signal continues to be delivered for longer than 1 clock period from an oscillator 23.

The release control circuit 10 starts the release with the rising up of the release signal obtained via the OR gate 9 when the bulb selecting switch 3 is opened, and carries out the release operation. When the bulb selecting switch 3 is closed, the shutter remains opened until the signal falls down at which point the release is terminated. The circuit 10 continues to deliver the in-release signal from the start until the termination of the release. 11 is an AND gate for obtaining the in-bulb-release signal from the above in-release signal and the bulb selecting signal from the bulb selecting switch 3, and 12 is a NOR gate for obtaining the counter clear release signal from the self mode signal from the DFF 4 and the in-bulb-release signal from the AND gate 11. 13 is a DFF and 14 is an AND gate, which together constitute a one shot circuit which receives the self operation signal from the DFF 4 and the clock pulse from the oscillator 23 so as to produce a counter set signal during a one clock period from the production of the self operation signal. 15 is a NOR gate for decoding that the outputs of the counters 19 and 20 are "0" and delivering the result to an AND gate 16. The AND gate 16 detects the output of the NOR gate 15 in the self mode and produces H as the self count termination signal when the outputs of the counters 19 and 20 become "0" after the counter is set. Basically, the self count is terminated, and 17 is a one shot pulse producing circuit which transmits H as the release signal to the producing control circuit 10 via the OR gate 9 to be triggered in response to the self count termination signal. 18 is a NAND gate which decodes "60" so as to deliver the counter stop signal to the counter 19. 19 and 20 are respectively a BCD up/down counter of 1 figure to be reset by the clear signal, the initial value is input at the input IN with the load signal, the up/down mode is changed over by the terminal up/down and the input clock pulses from the terminal CK are counted when H is applied to the terminal "carry in". Further, the count value of the counter always appears at the output terminal "out" in BCD code and the output at the terminal "carry out" is H when "9" is counted up to "0" or when "0" is counted down to "9". 21 and 22 are the indicators which convert the value input in the BCD code into the 7-segment lamp signal so as to indicate the input value by 7 segments, whereby the driving clocks for the indicating elements are obtained from a frequency divider 24. The counter 19 and the indicator 21 count and indicate the first figures, and the counter 20 and the indicator 22 count and indicate the second figures thus counting and indicating the two figures. 23 is a pulse oscillator, 24 is a frequency divider which divides the frequency of the clock pulses of the oscillator 23 to be delivered to a frequency divider 25 and the indicators 21 and 22. 25 is a frequency divider which divides the frequency only when the NOR gate 12 delivers the clear release signal, so as to deliver the clock pulses of 1 Hz to the counters 19 and 20.

Below, the operation of the camera of the present invention shown in FIG. 1 will be explained.

First, the case of ordinary photography will be explained.

In this case, both the self release mode and the bulb release mode are in the non-selected state such that both the self selecting switch 1 and the bulb selecting switch 3 are in an opened state. Thus, when the release button is depressed for the purpose of closing the release switch 2, the output DFF is kept as a low level signal (hereinafter called L) because the self selecting switch 1 is opened. Thus, the output of the inverter 6 becomes H, as well as the output of the AND gate 5 with the closure of the release switch 2 in such a manner that when the switch 2 is closed longer than 1 clock period of the oscillator 23 a release signal is delivered from the chattering preventing circuit composed of the DFF 7 and the AND gate 8 to the release control circuit 10 via the OR gate 9 so as to carry out the release.

Further, when the release if effected by the release control circuit 10, the exposure is controlled by the conventional shutter control circuit and the conventional exposure mechanism. After the lapse of a predetermined shutter time the shutter tail curtain starts to run thus terminating the exposure.

Further, in the case of ordinary photography the gate 12 delevers H so that the counters 19 and 20 remain in the cleared state and no figures are indicated by the indicators 21 and 22.

Now, the case of bulb photography will be explained.

In this mode the self selecting switch 1 is opened, while the bulb selecting switch 3 is closed. When in this state, the release button is depressed so as to close the release switch 2, and the release signal is delivered from the gate 8 to the release control circuit 10 in the same way as in the case of the above-mentioned ordinary photography. Because the bulb selecting switch 3 is closed, the release control circuit 10 is in the bulb mode so that with the rising up of the release signal the release operation is actuated, thus starting the exposure. Meanwhile, the shutter is kept in an opened state so as to continue the bulb release while the release signal is being given. Further, because the circuit 10 delivers the in-release signal during the bulb release, the signal and the close signal of the bulb selecting switch 3 are input into the AND gate 11, which delivers the above in-bulb-release signal to the NOR gate 12. Thus, the NOR gate 12 delivers the clear signal to the counters 19 and 20 and the frequency divider 25 so as to actuate then in synchronization with the release. Further, because at this time the DFF 4 delivers L, the "up" signal is given to the terminal "up/down" of the counters 19 and 20 so that the count operation of the counter by the above clear signal is in the clear state, namely that the value is counted up from the counter value "0" by the pulses of 1 Hz from the frequency divider 25.

Because the "up" count value is displayed in figures in the indicators 21 and 22, the display can be visually acknowledged as 0, 1, 2 ... for every second of the bulb time.

When the depression of the button stops after the above display value reaches the bulb time desired by the photographer the release switch 2 is opened and the release signal from the gate 8 disappears, namely, the signal becomes L, the release control circuit 10 stops operation and the tail shutter curtain starts to run so as to terminate the exposure. Further, because the in-release signal disappears with the disappearance of the above release signal, the gate 11 delivers L and the gate 12 delivers H. Thus, the counters 19 and 20 and the frequency divider 25 stop counting, and are again cleared. The display stops with the termination of the bulb photography.

Further, when in the case of bulb photography the release button is depressed for a long time to keep the release switch 2 closed, H is delivered from the outputs B and C of the counter 20 when the count value of the counters 19 and 20 reach "60" so that the NAND gate 18 delivers L to the carry-in terminal of the counter 19 for the first figures thus stopping the count operation. However, in this state, the counters 19 and 20 are not cleared, and therefore the indicator continues to display "60", namely, the lapse of 60 seconds until the release switch is opened.

Now, the self mode will be explained.

In this mode, the self selecting switch 1 is closed, while the bulb selecting switch 3 is opened. In this state, the release button is depressed so as to close the release switch 2 and the output of the DFF 4 becomes H and is latched. Thus, the counters 19 and 20 assume the down count state, while the NOR gate 12 delivers the release signal and the reset and the clear of the counters are released together with the frequency divider 25. Further, H of the DFF 4 is transmitted to the DFF 13 and the AND gate 14, whereby one shot pulse for one clock period of the oscillator 23 is delivered as the load signal from the gate 14 to the terminal LOAD of the counters 19 and 20. Thus, in the counters 19 and 20 the data "10" is via the input terminal IN. Thus "10" set in the counters 19 and 20 is counted down by the above-mentioned pulses of 1 Hz until it reaches "0", when the NOR gate 15 delivers H as the count termination signal. On the other hand, the Q output of the DFF 13 is input to the AND gate 16, this Q output of the DFF 13 being H in the self mode, so that the count termination signal is given to the one shot pulse producing circuit 17 via the gate 16, while the circuit 17 gives the release signal to the release control circuit 10 via the OR gate 9. Thus, the release control circuit 10 carries out the above release operation. Further, the count termination signal is input into the DFF 4 via the AND gate 16 so as to reset the DFF 4, whereby the NOR gate 12 delivers H. Basically, the clear release signal disappears so that the counters 19 and 20 and the frequency divider 25 assume the cleared state so as to terminate the counting. Namely, in the self mode, the value "10" set in the indicator is counted down at every second with the depression of the release button until the displayed value reaches "0", when the release operation is carried out.

Now, a case in which both the bulb mode and the self mode are selected, will be explained. In this state, the release button is depressed so as to close the switch 2 while both the self selecting switch 1 and the bulb selecting switch 3 are in the closed state. The same operation as in the case of the above self mode is carried out, and the displayed value "10" in the indicators 21 and 22 is counted down. Because the DFF 4 is reset when the value is counted down to "0", the count mode is changed over into the up count mode. Further, with the resetting of the DFF 4, H is applied to one input of the AND gate 5 via the inverter 6. Into the other input of the gate 5 the close signal for the switch 2 is input. Also, the release signal is input from the gate 8 after the lapse of the self time as mentioned above so as to carry out the release operation. Further, the circuit 10 delivers the in-release signal during the release in the bulb mode so that even when the DFF 4 is reset the gate 12 produces the clear release signal when the release operation is carried out. Thus, the counters again start the counting operation when the release operation starts after the lapse of the above self time. Because in this case the counter mode has been changed over from the down count to the up count as mentioned above, the counters 19 and 20 carry out the up counting when the bulb exposure starts, whereby at the same time the start of the exposure the lapse of time is displayed from "0" like 0→1→2 at every second in the indicator. After that in the same way as in the case of the above-mentioned bulb photography, when the release button stops being depressed the tail shutter curtain starts to run so as to terminate the exposure.

Figure 2:
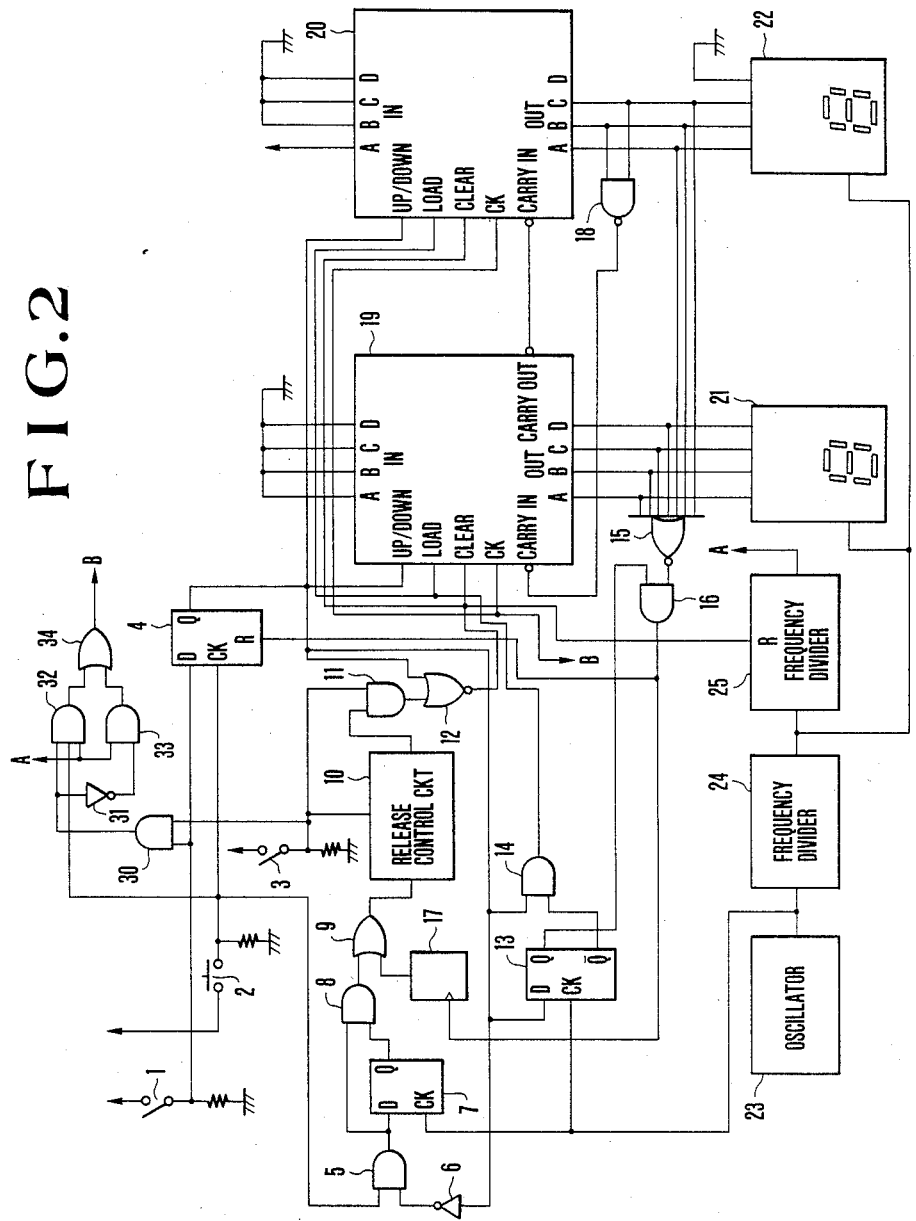
FIG. 2 is a circuit diagram showing another embodiment of the camera according to the present invention.

FIG. 2 showns a circuit of another embodiment of the present invention. In the drawing, the members having the same figures as in FIG. 1 are the same members. The only difference is that in the case of the embodiment in FIG. 2 an AND gate 30 for obtaining the AND of the close signals for the switches 1 and 3, an inverter 31 constituting the selector, AND gates 32, 33 and an OR gate 34 are provided in such a manner that when both the switches 1 and 3 are closed the output pulses of the frequency divider 25 are transmitted to the clock terminal CK of the counters 19 and 20 via the gate 32.

Below, the operation of the embodiment in FIG. 2 will be explained.

Because in the case of this circuit the output of the gate is L when both the switches 1 and 3 are not closed the gate 33 is selected. And, becaue the gate 33 serves to transmit the output of the frequency divider 25 to the clock terminal CK of the counters 19 and 20, the operation of the selected gate 33 is quite similar to that of the embodiment in FIG. 1 and therefore an explanation thereof will be omitted.

Further, when the bulb mode and the self mode are both selected the switches 1 and 3 are closed, the gate 30 delivers H, and the gate 32 is selected in place of the gate 33. Because the gate 32 is connected to the release switch 2, the output pulses of the frequency divider 25 are input to the clock terminal CK of the counters 19 and 20 only when the switch 2 is closed.

Thus, if the release button continues to be depressed during the self time, the bulb exposure is carried out after the lapse of the self time, the bulb exposure is carried out after the lapse of the self time in quite the same way as in the case of the embodiment in FIG. 1 and the corresponding display is made. However, when the desression of the release button stops during the self time so as to open the switch 2, the gate 32 is prohibited, whereby the count operation of the counters 19 and 20 is also phohibited. Thus, even if the release button is closed for a moment when selecting the self time mode, forgetting that the mode is set in the bulb mode, the clock of the self time and the exposure are phohibited. thus, in the case of this embodiment, even if an ordinary operation in the self mode is carried out (the release button being depressed for a moment), and it is forgotten that both the bulb mode and the self mode are selected, as in the case of the present embodiment, the photographing procedure of a bulb exposure being carried out in the self mode will not occur, and therefore the misphotographing due to a misoperation in the ordinary self mode can be prevented.

As stated above, according to the present invention bulb photography is made possible in the self mode, while the lapse of the self time and the bulb time as well as the change-over between the self mode and the bulb mode can be clearly recognized by the displyed value, which improves the operability. Instead of the 7-segment figure indicator being used as the indicator in the present embodiment, a plural number of dot marks or bar marks are arranged in a row and lit in sequence by the count value of the counter. Further, as the indicator, the accoustic means can be used, whereby the mode of the sound is made different between the self time and the bulb time.

What is claimed is:

1. A camera capable of bulb photography as well as self timer photography comprising:
    (a) A release operation member;
    (b) a photographing mode setting member;
    (c) a release circuit for carrying out the release operation;
    (d) a timer circuit;
    (e) a control circuit including: a first mode in which when the self timer photographing mode is set by the photographing mode setting member, the self time counting is carried out with the timer circuit by the operation of the release operation member, while the output of the self time counting by the timer circuit is transmitted to the release circuit so as to carry out the release operation, in response to the release circuit with the output of the counting; a second mode in which when the bulb photographing mode is set by the photographing mode setting member the release circuit is made to respond to the operation of the release operation member in such a manner that when said release operation member is operated the release operation is carried out and the exposure is terminated by the release by the release operation member and; a third mode in which when the self timer photographing mode and bulb photographing mode are set by the photographing mode setting member, the release circuit is operated in the first mode, interrupting the response of the release circuit to the operation of the release operation member in the second mode and the exposure is terminated when the operation of the release operation member is stopped in the second mode; and
    (f) an indicating circuit, said circuit assuming a first indicating mode until the release operation is carried out when the self timer photographing mode is set, a second indicating mode different from the first indicating mode from the start of the exposure when the bulb photographing mode is set, and said circuit assuming the first indicating mode until the release operation is carried out and the second indicating mode after the release operation is carried out when the self timer photographing and bulb photographing modes are set.

2. A camera capable of bulb photography and self timer photography comprising:
   (a) a release operation member;
   (b) a photographing mode setting member;
   (c) a control circuit which becomes operative when the bulb photographing and self timer photographing modes are set by the photographing mode setting member, and carries out the release operation after a lapse of time of the self timer by the operation of the release operation member and terminates the exposure operation with the stop of the operation of the release operation member; and
   (d) an indicating circuit, said circuit assuming a first indicating mode in which the time until the start of the exposure is indicated during the self timer timing and a second indicating mode different from the first indicating mode in which the time after the start of the exposure is indicated.

3. A camera capable of self timer photography and bulb photography comprising:
   (a) a photographing mode setting member;
   (b) a circuit which starts the exposure after a lapse of time of the self timer from the release operation and terminates the exposure with a stopping of the operation when the self timer photographing mode and the bulb photographing mode are set by the photographing mode setting member;
   (c) an indicating circuit, said circuit assuming a first indicating mode in which the time until the start of the exposure is indicated during the self timer timing and a second indicating mode different from the first indicating mode in which the lapse of time after the start of the exposure is indicated.

4. A camera according to one of claims 1–3, wherein said indicating circuit is a figure indicating circuit, which decreases the displayed figure along with a lapse of time in the first indicating mode and increases the displayed figure along with a lapse of time in the second indicating mode.

5. A camera according to claim 4, wherein said photographing mode setting member includes a first setting member for setting the bulb photographing mode and a second setting member for setting the self timer photographing mode.

6. A camera capable of bulb photography and self timer photography comprising:
   (a) a timing control circuit which has a first timer function for time counting of the exposure time in the case of bulb photography and a second timer function for time counting of the self timer in the case of self timer photography; and
   (b) an indicating circuit, said circuit carrying out the indication operation in a first indicating mode when it operates with a first timer function and the indication operation in a second indicating mode different from the first indicating mode when it operates with a second function.

7. A camera according to claim 6, wherein the first indicating mode is that in which the time until the start of the exposure is indicated and the second indicating mode is that in which a lapse of the exposure time is indicated.

8. A camera according to claim 7, wherein said indicating circuit is a figure indicating circuit, which decreases the displayed figure along with a lapse of time in the first indicating mode and increases the displayed figure along with a lapse of time in the second indicating mode.

9. A camera capable of bulb photography comprising:
   (a) a release operation member;
   (b) a timer for starting a time counting operation with the operation of the release operation member; and
   (c) an indicating circuit, said circuit assuming a first indicating mode until a lapse of a predetermined time after the start of the exposure is detected and a second indicating mode different from the first indicating mode after the lapse of the predetermined time.

10. A camera according to claim 9, wherein the first indicating mode is the one which changes along with the lapse of time and the second indicating mode is the one which is constant.

11. A camera capable of bulb photography and self timer photography comprising:
   (a) a timing control circuit which has a first timer efficiency for time counting of the exposure time in the case of bulb photography and a second timer efficiency for time counting of the self timer in the case of self timer photography; and
   (b) an indication signal producing circuit for producing the indication signal for carrying out the indication operation in the first indication mode when the timing control circuit operates in the first timer function and in the second indication mode different from the first indication mode when the timing control circuit operates in the second timer function.

12. A camera capable of self timer photography comprising:
   (a) a timing control circuit for performing a time counting operation of the self timer and performs a time counting operation of a lapse of the time after the start of the exposure; and
   (b) an indicating circuit which assumes a first indicating mode during the time of counting operation of the self timer by the timing control circuit and a second indicating mode different from the first indicating mode after the start of the exposure.

13. A camera according to claim 12, wherein the first indicating mode is that in which the time until the start of the exposure is indicated and the second indicating mode is that in which a lapse of the exposure time is indicated.

* * * * *